2,776,965

NITRIC ACID ESTERS OF CELLULOSE AND METHOD OF PREPARATION

James L. Bennett, Wilmington, Del., and Robert M. Brooks, Milltown, James G. McMillan, Jr., Red Bank, and Warren L. Plunkett, Sayreville, N. J., assignors to Hercules Powder Company, Wilmington, Del., a corporation of Delaware No Drawing. Application March 28, 1956, Serial No. 574,388

17 Claims. (Cl. 260—220)

This invention relates to new nitric acid esters of cellulose and their preparation; more particularly this invention relates to new nitric acid esters of cellulose free of unstable sulfur compounds and to a method for preparing these esters employing nitrating mixtures containing essentially nitric acid, magnesium nitrate and water.

The only commercial method for preparing nitric acid esters of cellulose employs nitrating mixtures containing essentially nitric acid, sulfuric acid and water. During nitration small amounts of unstable sulfate esters are formed which must be subsequently destroyed by hydrolysis during lengthy stabilization treatment by boiling in dilute acid solutions. Unless thus treated the nitric acid esters are extremely unstable and unfit for use. However, it is impossible to remove all sulfate groups without causing considerable hydrolysis of the nitrate groups; hence, even the stabilized nitrocellulose of industry still contains traces of unstable sulfur compounds. The stabilization treatment aims to remove sufficient unstable sulfate esters so that the final product will meet at least minimum heat stability requirements as measured by the 134.5° C. heat test.

Moreover, nitrating mixtures containing nitric acid-sulfuric acid-water penetrate into the cellulose relatively slowly. Therefore, it is necessary to prepare the cellulose for nitration with extreme care. Cotton linters must be thoroughly fluffed up and must be substantially free of all closely packed aggregates of fibers such as balls, pills and the like. Wood pulp must be shredded completely to thoroughly open up the fiber aggregates.

Unless this is very carefully and thoroughly done the nitration will be nonuniform and the final product will not dissolve completely in solvents to form smooth, clear solutions which are necessary to commercial utilization.

Hence it is apparent that the present commercial process for preparing nitrocellulose requires very careful control and treatment of the cellulose supply to insure uniform products and requires a tedious and lengthy stabilization treatment to produce a stable product.

Much effort has been devoted to develop a practical and economical process for nitrating cellulose which would overcome the recognized disadvantages of the present commercial process involving mixed nitric-sulfuric nitrating mixtures. Heretofore, all such proposed processes have been neither practical nor have they produced acceptable products of commercial utility due to nonuniform nitration resulting in products having poor solubility characteristics.

Now in accordance with this invention novel nitric acid esters of cellulose are produced by reacting cellulose with a nitrating mixture containing essentially nitric acid, magnesium nitrate and water, the ratio of magnesium nitrate to water being at least about 1.2:1 and not more than about 2.2:1 by weight and said nitric acid being present in an amount sufficient to yield a nitric acid ester of cellulose having a nitrogen content of from about 11% to about 13.5% by weight.

More particularly, novel nitric acid esters of cellulose are produced by reacting cellulose with a nitrating mixture containing essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1.

A more specific nitrating mixture suitable for preparing most types of nitrocellulose contains essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1. Since the nitrating mixtures of this invention contain no sulfuric acid, there are no unstable sulfate esters to contend with, and hence the resulting nitric acid esters do not require a long and tedious stabilization treatment following nitration to produce stable products. The nitric acid esters formed, after removal of the spent nitrating mixture, are stable for about 15 minutes in the standard 134.5° C. heat test without the necessity of any subsequent stabilization treatment.

Within the operative range set forth above there is a preferred range particularly well adapted for commercial practice wherein the ratio of magnesium nitrate to water is at least about 1.3:1 and not more than about 2:1, and wherein the nitrating mixture is free of undissolved magnesium nitrate.

A particular embodiment of this invention involves immersing cellulose in a bath of nitrating mixture containing essentially between about 45% and about 80% nitric acid, between about 10% and about 34% magnesium nitrate and between about 7% and about 21% water by weight, the ratio of magnesium nitrate to water being at least about 1.3:1 and not more than about 2:1, said nitrating mixture being free of undissolved magnesium nitrate, the ratio of said nitrating mixture to cellulose being at least about 20:1 by weight, nitrating the cellulose at a temperature between about 15° C. and about 70° C. for at least about 8 minutes and until nitration is substantially complete, and recovering uniformly substituted nitric acid esters of cellulose substantially completely soluble in acetone to form smooth, clear solutions.

In a preferred embodiment of the invention, after nitration the spent nitrating mixture is removed from the resulting nitric acid esters, and stable nitric acid esters of cellulose are recovered directly, without subsequent stabilization treatment. Following nitration and removal of spent nitrating mixture, the nitric acid esters may be subjected to subsequent conventional and well-known treatment for viscosity control, bleaching, dehydration, and the like as desired.

The process in accordance with this invention is particularly well adapted for continuous operation because the nitrating mixture penetrates even dense aggregates of fibers such as sheeted linters or sheeted wood pulp rapidly and uniformly, and hence nitration is rapid and uniform. This is in marked contrast to the present commercial method of making nitrocellulose employing mixed nitric-sulfuric acids, which has never been successfully adapted to continuous operation, due principally to the necessity for having the cellulose thoroughly fluffed or completely shredded in order to obtain uniform nitration.

The new products of this invention are nitric acid esters of cellulose containing between about 11% and about 13.5% nitrogen in the substituent nitrate groups. They are free of unstable sulfur compounds, stable for about 15 minutes in the 134.5° C. heat test, and contain detectable amounts of magnesium nitrate less than about 70 parts per million by weight, based on the weight of the product. Preferred products are uniformly substituted, being substantially completely soluble in acetone to form smooth, clear solutions.

The following examples set forth some specific embodiments of this invention, but these are not to be construed as limiting the invention.

EXAMPLE 1

A nitrating mixture was prepared which contained 62.56% nitric acid, 22.52% magnesium nitrate, 14.91% water, and 0.01% $N_2O_3$ by weight. The $N_2O_3$ was only an incidental ingredient in the nitrating mixture, being present in the concentrated nitric acid employed. It is well recognized in the art that concentrated nitric acid often contains small percentages of $N_2O_3$. The mixture was brought to 50° C. and 1 part by weight of shredded wood pulp dried 1 hour at 100° C. was immersed or dipped into 54 parts by weight of the nitrating mixture with agitation to form a slurry. The slurry of cellulose was nitrated at about 50° C. for 10 minutes while agitating, after which the slurry of nitrocellulose in the spent nitrating mixture was run into a centrifuge. As much as possible of the spent nitrating mixture was separated from the fibrous nitrocellulose by centrifugal force, and the nitrocellulose was then drowned in a large excess of water, about 60 parts water to 1 part nitrocellulose. After draining off the drowning bath, the nitrocellulose was washed with fresh water until free of acid. The water-wet nitrocellulose was then dried in a stream of air at about 60° C., and the resulting dried nitrocellulose was found to be stable for about 15 minutes in the standard 134.5° C. heat test. It dissolved substantially completely in acetone to form a smooth, clear solution, thus demonstrating that it was uniformly substituted. The nitrogen content determined by the standard nitrometer method on a sample dried for 1 hour at 105° C. was found to be 12.08% by weight.

EXAMPLE 2

A nitrating mixture was prepared which contained 65.26% nitric acid, 20.35% magnesium nitrate, 14.34% water, and 0.05% $N_2O_3$. This mixture was brought to 50° C. and 1 part of air-dry sheeted wood pulp about 0.05 inch thick cut into 3-inch squares was immersed or dipped into 66 parts by weight of the nitrating mixture with agitation. The cellulose was nitrated at about 50° C. for a period of 20 minutes with agitation, after which the nitrating mixture was drained off, and the sheets of nitrocellulose were drowned in a large excess of water, about 60 parts water to 1 part nitrocellulose. After draining off the drowning bath, the nitrocellulose was washed with fresh water until free of acid and was dried in a stream of air at about 60° C. The nitrogen content was found to be 11.62% by weight. The nitrocellulose had a stability of about 15 minutes in the 134.5° C. heat test and formed a clear, smooth solution in acetone.

EXAMPLES 3–13

A series of nitrocelluloses was prepared following substantially the procedure set forth in Example 1. Table 1 lists pertinent data for these examples including composition of the nitrating mixtures, nitration times and temperatures, type cellulose employed, ratio of nitrating mixture to cellulose, percent nitrogen, acetone solubility, and stability in the 134.5° C. heat test.

*Table 1*

| Example | Nitrating Composition, Percent by Wt. | | | | Nitration Temperature, °C. | Nitration Time, Minutes | Type Cellulose | Ratio Nitrating Mixture: Cellulose (By weight) | Percent Nitrogen | Acetone Solubility (Solution Appearance) | Stability [1] 134.5° C. Heat test (Minutes) |
|---|---|---|---|---|---|---|---|---|---|---|---|
| | Nitric Acid | Magnesium Nitrate | Water | $N_2O_3$ | | | | | | | |
| 3 | 60.00 | 23.30 | 16.70 | | 50 | 45 | Fluffed Bulk Linters | 54 | 11.05 | Clear, smooth | 18 |
| 4 | 56.00 | 27.30 | 16.70 | | 40 | 11 | Shredded wood pulp | 54 | 11.76 | do | 12+ |
| 5 | 50.00 | 31.72 | 18.28 | | 50 | 25 | do | 54 | 11.91 | do | 12+ |
| 6 | 60.00 | 24.40 | 15.70 | | 50 | 10 | do | 54 | 11.95 | do | 16 |
| 7 | 54.00 | 29.00 | 17.00 | | 50 | 45 | Fluffed Bulk Linters | 54 | 12.16 | do | 14 |
| 8 | 50.00 | 32.70 | 17.30 | | 50 | 25 | Shredded wood pulp | 54 | 12.26 | do | 12+ |
| 9 | 67.30 | 19.27 | 13.41 | 0.02 | 50 | 10 | do | 54 | 12.37 | do | 15 |
| 10 | 69.73 | 18.12 | 12.13 | 0.02 | 50 | 25 | do | 54 | 12.57 | do | 12+ |
| 11 | 58.91 | 27.45 | 13.63 | 0.01 | 50 | 25 | do | 54 | 12.87 | do | 12+ |
| 12 | 69.74 | 20.00 | 10.24 | 0.02 | 50 | 25 | do | 54 | 13.23 | do | 12+ |
| 13 | 75.20 | 15.80 | 9.00 | | 50 | 12 | do | 55 | 13.39 | do | 12+ |

[1] The designation 12+ means that the sample was still stable at the end of 12 minutes and the test was stopped at this point.

EXAMPLE 14

A series of nitrocelluloses was prepared following the procedure in Example 4, varying the temperature of nitration from 25° to 50° C. as illustrated in Table 2 following.

*Table 2*

| Temperature of Nitration, ° C. | Percent Nitrogen in the Nitrocellulose |
|---|---|
| 25 | 11.59 |
| 30 | 11.71 |
| 40 | 11.76 |
| 50 | 11.90 |

EXAMPLE 15

A series of nitrocelluloses was prepared following the procedure in Example 1, varying the temperature of nitration from 50° C. to 90° C. as illustrated in Table 3 following.

*Table 3*

| Temperature of Nitration, ° C. | Percent Nitrogen in the Nitrocellulose |
|---|---|
| 50 | 12.08 |
| 60 | 12.07 |
| 70 | 12.12 |
| 90 | 12.03 |

EXAMPLE 16

A series of nitrocelluloses was prepared following the procedure in Example 1, employing a nitrating mixture containing 56.2% nitric acid, 27.2% magnesium nitrate, and 16.6% water by weight, and varying the time of nitration from 2 minutes to 20 minutes as illustrated in Table 4 following.

Table 4

| Time of Nitration in Minutes | Percent Nitrogen in the Nitrocellulose |
| --- | --- |
| 2 | 11.51 |
| 4 | 11.74 |
| 6 | 11.89 |
| 7.5 | 11.90 |
| 11 | 12.17 |
| 20 | 12.11 |

EXAMPLE 17

The procedure in Example 1 was followed employing a nitrating mixture containing 65.00% nitric acid, 20.42% magnesium nitrate, and 14.58% water by weight, and employing a ratio of 20 parts nitrating mixture for each part of cellulose by weight. The cellulose was readily slurried in the nitrating mixture without any difficulty and the resulting slurry was readily and effectively stirred in the nitrating pot. The resulting nitrocellulose had a nitrogen content of 12.10%, was stable for about 15 minutes in the standard 134.5° C. heat test and dissolved substantially completely in acetone to form smooth, clear solutions.

EXAMPLES 18–23

A series of nitrocelluloses was prepared following substantially the procedure set forth in Example 1. Table 5 lists pertinent data for these examples including composition of the nitrating mixtures, nitration times and temperatures, type of cellulose employed, ratio of nitrating mixture to cellulose, and percent nitrogen in the nitrocellulose product.

Table 5

| Example | Nitrating Composition, Percent by Wt. | | | | Nitration Temperature, °C. | Nitration Time Minutes | Type Cellulose | Ratio Nitrating Mixture: Cellulose (By weight) | Percent Nitrogen | Ratio Magnesium Nitrate to Water (By weight) |
| --- | --- | --- | --- | --- | --- | --- | --- | --- | --- | --- |
| | Nitric Acid | Magnesium Nitrate | Water | $N_2O_3$ | | | | | | |
| 18 | 84.80 | 9.13 | 6.00 | 0.07 | 50 | 10 | Shredded wood pulp | 32 | 13.38 | 1.52 |
| 19 | 89.33 | 5.78 | 4.75 | 0.14 | 50 | 10 | ----do---- | 32 | 13.36 | 1.22 |
| 20 | 84.80 | 9.13 | 6.00 | 0.07 | 50 | 10 | ----do---- | 50 | 13.57 | 1.52 |
| 21 | 79.76 | 11.84 | 8.37 | 0.03 | 40 | 30 | Sheeted [1] wood pulp tablets | 10 | 12.59 | 1.41 |
| 22 | 93.62 | 3.63 | 2.65 | 0.10 | 35 | 45 | ----do [1]---- | 6 | 12.76 | 1.37 |
| 23 | 90.47 | 5.56 | 3.92 | 0.05 | 50 | 30 | ----do [1]---- | 32 | 13.46 | 1.42 |

[1] The sheeted wood pulp tablets were approximately 3/16 inch long x 3/32 inch wide x 0.05 inch thick.

The nitrating mixtures in accordance with this invention contain three essential ingredients, namely, nitric acid, magnesium nitrate and water, the ratio of magnesium nitrate to water being at least about 1.2:1 and not more than about 2.2:1, and the nitric acid being present in an amount sufficient to yield a nitric acid ester of cellulose having a nitrogen content of from about 11% to about 13.5% by weight. It will be understood, of course, that the sum of the three essential components will constitute substantially 100% of the nitrating mixture, any $N_2O_3$ being only an incidental ingredient in the nitrating mixture, since it is well recognized that concentrated nitric acid often contains small percentages of $N_2O_3$, usually on the order of 0.1% or less. Although for most purposes the nitrating mixtures of this invention will usually contain between about 45% and about 94% nitric acid, between about 3.3% and about 34% magnesium nitrate, and between about 2.7% and about 21% water by weight, it is to be understood that the invention is not to be construed as limited in this respect, since the important feature is the ratio of magnesium nitrate to water as set forth hereinabove, nitric acid being present in an amount sufficient to yield a nitric acid ester of cellulose having a nitrogen content between about 11% and about 13.5% by weight.

It has been found that nitration in accordance with this invention is an equilibrium reaction, the extent of nitration at equilibrium being governed primarily by the composition of the nitrating mixture. It has been further established that at any given nitric acid content within the limits set forth hereinabove the nitrogen content of the resulting nitrocellulose increases with decreasing water content, in general a decrease of 0.1% in the water content of the nitrating mixture causing a corresponding increase of about 0.05% nitrogen in the nitrocellulose, and vice versa. Obviously, of course, for each change in water content there will necessarily be a corresponding inverse change in the magnesium nitrate content of the nitrating mixture. Similarly, it has been found that at any given water content within the limits set forth hereinabove the nitrogen content of the resulting nitrocellulose decreases with increasing nitric acid content, in general an increase of 1% in the nitric acid content of the nitrating mixture causing a corresponding decrease of about 0.1% nitrogen in the nitrocellulose, and vice versa. Here, likewise, for each change in nitric acid content there will necessarily be a corresponding inverse change in the magnesium nitrate content of the nitrating mixture.

Hence, it is obvious that there are numerous nitrating mixtures within the operating limits set forth for preparing any particular nitrocellulose having a preselected nitrogen content. The particular nitrating mixture to be employed will therefore be largely a matter of choice governed primarily by economic considerations.

Preferred nitrating mixtures in accordance with this invention are free of undissolved magnesium nitrate at the nitrating temperature selected, and preferably such solutions should not be supersaturated with respect to magnesium nitrate. Additionally, in preferred nitrating mixtures the ratio of magnesium nitrate to water is at least about 1.3:1 and not more than about 2:1 by weight.

A convenient method for preparing the nitrating mixtures of this invention is as follows: magnesium carbonate is slurried with water to form a thick paste, nitric acid of 98%+ strength is then added slowly until the solution is just acid to litmus paper. The solution is then boiled to remove water until the desired magnesium nitrate concentration is obtained. The magnesium nitrate solution is then weighed, cooled to about 80° C. and the requisite quantity of strong nitric acid, 98%+ strength of known composition, is weighed in, additional water, if necessary, is added, and the mixture is stirred until homogeneous. Magnesium oxide or magnesium hydroxide can be substituted for the magnesium carbonate.

Another convenient method consists in melting commercial crystals of magnesium nitrate hexahydrate, $Mg(NO_3)_2.6H_2O$, and boiling until the desired concentration of magnesium nitrate is obtained. The solution is then weighed, cooled to about 80° C. and the requisite quantity of strong nitric acid, 98%+ strength of known composition, and additional water, if necessary, are added and the mixture stirred until homogeneous.

A convenient method of analysis for checking the composition of nitrating mixtures consists in determining total acidity by titration with sodium hydroxide, determining nitrogen trioxide by titration with potassium permanganate, and determining magnesium nitrate by adding a known quantity of sulfuric acid, evaporating to remove the nitric acid and the nitrate (as nitric acid), and titrating the excess sulfuric acid with sodium hydroxide. Water is computed by difference. Total acidity can be consistently checked within 0.06% and magnesium nitrate within 0.10% by this method.

Any of the usual commercial forms of cellulose can be employed in this invention including cotton, cotton linters, wood pulp, regenerated cellulose, and the like. This can be in any form including fibers, staple fibers, filaments, small shreds, chips, shredded linters, shredded wod pulp, granules, sheets, finely ground, fluffed bulk fibers, and the like. It is presently preferred to employ shredded or fluffed wood pulp or shredded or fluffed cotton linters or mixtures of these since these forms of chemical cellulose are particularly well adapted to present commercial nitrocellulose facilities.

It is emphasized that cellulose can react with any quantity of the nitrating mixtures of this invention to form nitric acid esters of cellulose. However, in reacting cellulose with the nitrating mixtures of this invention nitric acid is consumed and water is formed. From a practical consideration it is desirable to employ an excess of nitrating mixture over the theoretical stoichiometric requirements. With the customary nitrating equipment in common use in the industry and employing the customary forms of chemical cellulose, it is presently preferred to employ at least about 20 parts of nitrating mixture to 1 part of cellulose by weight so that the water formed in the reaction will not unduly dilute the nitrating mixture, but it is to be understood that the invention is not limited in this respect. With other forms of cellulose and/or other conditions of nitration less than 20 parts nitrating mixture to 1 part cellulose are quite feasible as illustrated by the examples. It will be apparent that larger quantities can be employed, such as 30, 40, 50, 60, 70, or even more parts per part of cellulose, as desired. However, the economics of the process will usually govern the ratio of nitrating mixture to cellulose, it being most economical to nitrate with the lowest ratio that will give a high quality product.

A wide range of temperatures can be employed in practicing this invention. For practical reasons, however, it is not desirable to employ temperatures below about 15° C. or higher than about 70° C. Below about 15° C. the reaction becomes too slow to be economically attractive, and above about 70° C. the nitrocellulose tends to crumble so that mechanical losses in the process become excessive. A preferred range of temperatures lies between about 40° C. and about 60° C., with temperatures of about 50° C. being particularly suitable.

The nitration reaction in accordance with this invention is very rapid, a major portion of the substituent nitrate groups often being introduced within a matter of two minutes or less. However, a uniformly substituted nitrocellulose in equilibrium with the nitrating mixture usually requires nitration for a longer period of time depending primarily upon the temperature of nitration and the form of cellulose employed. In any case nitration will ordinarily be continued until nitration is substantially complete and the resulting nitrocellulose is in equilibrium with the nitrating mixture. With the customary shredded wood pulp or shredded linters at temperatures above about 30° C. it has been found that at least about 8 minutes is required to obtain a uniformly substituted nitrocellulose. Under similar conditions the commercial process employing mixed nitric-sulfuric acids requires at least about 18 minutes to obtain uniform nitration. Denser forms of cellulose such as sheets, granules and the like require longer nitration times to achieve a uniformly substituted product, in some instances as much as 45 minutes or more, under similar temperature conditions to achieve uniform substitution. Since the rate of nitration is slower at lower temperatures it follows that longer nitration times are required at lower temperatures.

Agitation during the reaction hastens rapid and uniform wetting of all parts of the cellulose with the nitrating mixture, and hence is preferred whenever possible. For economic reasons nitration time will ordinarily be held to a minimum consistent with obtaining a uniformly substituted product, and for any particular case this can readily be established by the simple expedient of determining nitrogen content of the nitrocellulose and testing solubility of the product in acetone.

Following nitration it is necessary to remove the spent nitrating mixture from the resulting nitrocellulose substantially completely in order to recover a usable product. This can be accomplished by draining off as much as possible of the spent nitrating mixture by gravity drainage, by suction, by centrifugation or similar means. This leaves a cake or mat of nitrocellulose still wet with adhering spent nitrating mixture which must be removed. The wet cake or mat of nitrocellulose is then broken up and drowned in a large excess of water with agitation. The objective of this drowning operation is to dilute very rapidly and substantially the adhering spent nitrating mixture remaining on the nitrocellulose and thus prevent hydrolytic damage to the nitrocellulose. Ordinarily 50 or more parts of water to 1 part nitrocellulose is employed for drowning the nitrocellulose. The drowning bath is then drawn off by any suitable means and the nitrocellulose is then washed with fresh water until tests for acidity show that substantially all nitrating mixture has been removed. Washing can be accomplished by any of the well-known methods for washing a solid with a liquid, including displacement or spray washing with gravity, suction, or centrifugation, decantation and the like. Washing is continued until substantially all of the adhering nitrating mixture has been washed out as determined by test on the wash liquor.

The resulting washed nitrocellulose is stable to heat and does not require a subsequent stabilization treatment by boiling in dilute acid solution for lengthy periods such as is essential when mixed nitric-sulfuric acid is employed as the nitrating mixture. Hence the nitrocelluloses of this invention following water washing are ready to be treated immediately as desired by any of the well-known and conventional methods for adjusting viscosity, bleaching, dehydration and the like. For some purposes the water-wet nitrocellulose can be used directly. However, as is well known, most soluble nitrocellulose of commerce is dehydrated with a suitable liquid such as ethyl alcohol, for example, before use.

In accordance with this invention novel nitric acid esters are prepared which contain between about 11% and about 13.5% nitrogen in the substituent nitrate groups. These nitrocelluloses are free of unstable sulfur compounds since there are no sulfur-containing compounds employed in the nitrating mixtures, and they are stable for about 15 minutes in the standard and well-known 134.5° C. heat test. These nitrocelluloses usually contain detectable amounts of magnesium nitrate less than about 70 parts per million by weight based on the weight of the nitrocellulose. Preferred nitrocelluloses in accordance with this invention are uniformly substituted as evidenced by the fact that they dissolve substantially completely in acetone to form clear, smooth solutions.

This invention has several notable advantages over the well-known commercial process for producing nitrocellulose which employs mixed nitric-sulfuric acids. To begin with the nitrating mixtures of this invention penetrate and wet even relatively dense aggregates of cellulose particles rapidly and uniformly in contrast to mixed nitric-sulfuric acid which requires that the cellulose be very carefully shredded, fluffed and opened up and made free of closely packed aggregates of fibers such as pills, balls and the like. The nitration reaction of this invention is much more rapid than the well-known commercial process. The process of this invention is readily adapted to continuous operation whereas, heretofore, continuous operation has never been successful. This invention provides stable nitrocelluloses without the necessity for long tedious stabilization treatment heretofore necessary. Moreover, this invention provides nitrocelluloses which are uniformly substituted as evidenced by substantially complete solubility in acetone, and which are free of sulfur. Heretofore products having these combined characteristics have not been produced.

The nitrocelluloses of this invention are useful in all well-known applications for nitrocellulose where the nitrocellulose contains between about 11% and 13.5% nitrogen, including plastics, films, lacquers, protective coatings, moistureproof coatings, coated fabrics, adhesives, explosives, and many others.

The 134.5° C. heat test referred to herein in the specification and claims is described in A. S. T. M. D 301–33 Part II of the Book of 1946 on page 1086 with revisions on page 1712.

This is a continuation-in-part of our copending application, Serial No. 264,854, filed January 3, 1952, now abandoned.

What we claim and desire to protect by Letters Patent is:

1. A process for preparing nitric acid esters of cellulose which comprises reacting cellulose with an excess over theoretical stoichiometric requirements of nitrating mixture containing essentially nitric acid, magnesium nitrate and water, the ratio of magnesium nitrate to water being at least about 1.2:1 and not more than about 2.2:1 by weight, and said nitric acid being present in an amount sufficient to yield a nitric acid ester of cellulose having a nitrogen content of from about 11% to about 13.5% by weight.

2. A process for preparing nitric acid esters of cellulose which comprises reacting cellulose with an excess over theoretical stoichiometric requirements of nitrating mixture containing essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1.

3. A process in accordance with claim 2 wherein the ratio of nitrating mixture to cellulose is at least about 20:1 by weight.

4. A process in accordance with claim 2 wherein the ratio of magnesium nitrate to water is at least about 1.3:1 and not more than about 2.0:1, the nitrating mixture being substantially free of undissolved magnesium nitrate.

5. A process in accordance with claim 2 wherein the cellulose is nitrated at a temperature between about 15° C. and about 70° C. until nitration is substantially complete and the resulting nitrocellulose is in equilibrium with the spent nitrating mixture.

6. A process for preparing nitric acid esters of cellulose which comprises reacting cellulose with an excess over theoretical stoichiometric requirements of nitrating mixture containing essentially between about 45% and about 80% nitric acid, between about 10% and about 34% magnesium nitrate and between about 7% and about 21% water by weight, the ratio of magnesium nitrate to water being at least about 1.2:1 and not more than about 2.2:1.

7. A process for preparing nitric acid esters of cellulose which comprises reacting cellulose with a nitrating mixture containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, the ratio of said nitrating mixture to cellulose being at least about 20:1 by weight.

8. A process for preparing nitric acid esters of cellulose which comprises reacting cellulose with an excess over theoretical stoichiometric requirements of nitrating mixture containing essentially between about 45% and about 80% nitric acid, between about 10% and about 34% magnesium nitrate, and between about 7% and about 21% water, the ratio of magnesium nitrate to water being at least about 1.3:1 and not more than about 2.0:1, said nitrating mixture being substantially free of undissolved magnesium nitrate.

9. A process for preparing nitric acid esters of cellulose which comprises reacting cellulose with an excess over theoretical stoichiometric requirements of nitrating mixture containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, removing spent nitrating mixture from the resulting nitric acid esters of cellulose, and recovering directly, without subsequent stabilization treatment, stable nitric acid esters of cellulose.

10. A continuous process for preparing nitric acid esters of cellulose which comprises continuously reacting cellulose with a nitrating mixture containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, the ratio of said nitrating mixture to cellulose being at least about 20:1 by weight.

11. A process for preparing nitric acid esters of cellulose which comprises immersing cellulose in a bath of nitrating mixture containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, the ratio of said nitrating mixture to cellulose being at least about 20:1 by weight, and nitrating the cellulose at a temperature between about 15° C. and about 70° C.

12. A process for preparing nitric acid esters of cellulose which comprises immersing cellulose in a bath of nitrating mixture containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, the ratio of said nitrating mixture to cellulose being at least about 20:1 by weight, nitrating the cellulose at a temperature between about 15° C. and about 70° C., removing spent nitrating mixture from the resulting nitric acid esters of cellulose, and recovering directly, without subsequent stabilization treatment, stable nitric acid esters of cellulose.

13. A process for preparing nitric acid esters of cellulose which comprises immersing cellulose in a bath of nitrating mixture containing essentially between about 45% and about 80% nitric acid, between about 10% and about 34% magnesium nitrate, and between about 7% and about 21% water by weight, the ratio of magnesium nitrate to water being at least about 1.3:1 and not more than about 2.0:1, said nitrating mixture being substantially free of undissolved magnesium nitrate, the ratio of said nitrating mixture to cellulose being at least about 20:1 by weight, nitrating the cellulose at a temperature between about 15° C. and about 70° C. for at least about 8 minutes and until nitration is substantially complete, and recovering uniformly substituted nitric acid esters of cellulose substantially completely soluble in acetone to form smooth, clear solutions.

14. A process for preparing nitric acid esters of cellulose which comprises immersing cellulose in a bath of nitrating mixture containing essentially between about 45% and about 80% nitric acid, between about 10% and 34% magnesium nitrate, and between about 7% and about 21% water by weight, the ratio of magnesium nitrate to water being at least about 1.3:1 and not more than about 2.0:1, said nitrating mixture being substantially free of undissolved magnesium nitrate, the ratio of said nitrating mixture to cellulose being at least about 20:1 by weight, nitrating the cellulose at a temperature between about 15° C. and about 70° C. for at least about 8 minutes and until nitration is substantially complete, removing spent nitrating mixture from the resulting nitric acid esters of cellulose, and recovering directly, without subsequent stabilization treatment, uniformly substituted stable nitric acid esters of cellulose substantially completely soluble in acetone to form smooth, clear solutions.

15. A continuous process for preparing nitric acid esters of cellulose which comprises continuously immersing a sheet of cellulose in a bath of nitrating mixture containing essentially between about 45% and about 80% nitric acid, between about 10% and about 34% magnesium nitrate, and between about 7% and about 21% water by weight, the ratio of magnesium nitrate to water being at least about 1.3:1 and not more than about 2.0:1, said nitrating mixture being substantially free of undissolved magnesium nitrate, the ratio of said nitrating mixture to cellulose being at least about 20:1 by weight, continuously nitrating the cellulose at a temperature between about 15° C. and about 70° C. for at least about 8 minutes and until nitration is substantially complete, continuously removing spent nitrating mixture from the resulting nitrated sheet, and continuously recovering directly, without subsequent stabilization treatment, uniformly substituted, stable nitric acid esters of cellulose substantially completely soluble in acetone to form smooth, clear solutions.

16. A continuous process for preparing nitric acid esters of cellulose which comprises continuously immersing a sheet of cellulose in a bath of nitrating mixture containing essentially between about 45% and about 80% nitric acid, between about 10% and about 34% magnesium nitrate, and between about 7% and about 21% water by weight, the ratio of magnesium nitrate to water being at least about 1.3:1 and not more than about 2.0:1, said nitrating mixture being substantially free of undissolved magnesium nitrate, the ratio of said nitrating mixture to cellulose being at least about 20:1 by weight, continuously nitrating the cellulose at a temperature between about 15° C. and about 70° C., continuously removing spent nitrating mixture from the resulting nitrated sheet, and continuously recovering directly, uniformly substituted, stable nitric acid esters of cellulose substantially completely soluble in acetone to form smooth, clear solutions.

17. A new nitric acid ester of cellulose having a nitrogen content of from about 11% to about 13.5% by weight and being free of unstable sulfur compounds, said ester being the reaction product of cellulose with an excess over theoretical stoichiometric requirements of nitrating mixture containing essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1.

References Cited in the file of this patent

UNITED STATES PATENTS 2,400,287     Caeser     May 14, 1946

OTHER REFERENCES

Heuser: "Cellulose Chemistry," 1944, pages 183, 200, and 215.